United States Patent [19]
Bobard

[11] 3,765,697
[45] Oct. 16, 1973

[54] HYDRAULIC JACK ARRANGEMENT FOR THE STEERING MECHANISM OF A VEHICLE

[76] Inventor: Emile Bobard, 17 Rue de Reon, Beaune, France

[22] Filed: Mar. 10, 1971

[21] Appl. No.: 122,669

Related U.S. Application Data

[63] Continuation-in-part of Ser. No. 783,306, Dec. 12, 1968, abandoned.

[52] U.S. Cl.............................. 280/95 R, 280/87 B
[51] Int. Cl................................................ B62d 7/06
[58] Field of Search..................... 280/95, 90, 34 R, 280/87 B, 80; 180/79.2 R

[56] References Cited
UNITED STATES PATENTS

| | | |
|---|---|---|
| 1,806,136 | 5/1931 | Weiss................................ 280/87 B |
| 2,111,668 | 3/1938 | Latzen............................... 280/87 B |
| 2,173,419 | 9/1939 | Johnson................................ 280/80 |
| 3,291,245 | 12/1966 | Hewko............................... 180/79.2 |

FOREIGN PATENTS OR APPLICATIONS

| | | | |
|---|---|---|---|
| 853,578 | 11/1960 | Great Britain....................... 280/95 |

*Primary Examiner*—Kenneth H. Betts
*Attorney*—Wilkinson, Mawhinney & Theibault

[57] ABSTRACT

A hydraulic piston and cylinder device which permits automatic adjustment of the length of a coupling bar for the two crank arms of the steering pivot of a four-wheeled vehicle as a function of the angles of pivoting of these wheels. This device permits very large angles of pivoting for the inside wheel on the turn and good operation of the steering system.

8 Claims, 9 Drawing Figures

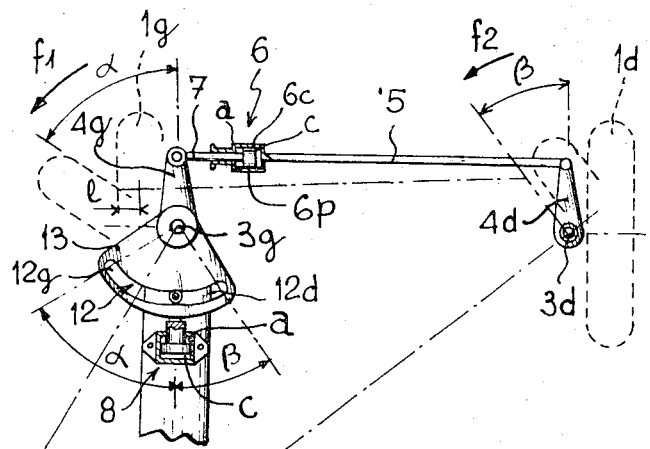
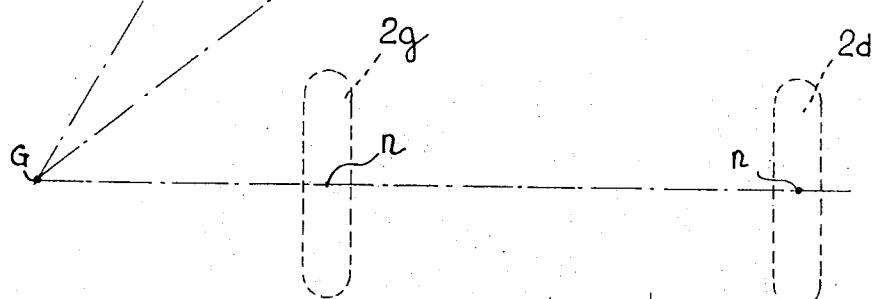
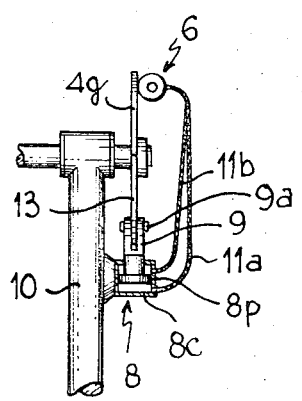
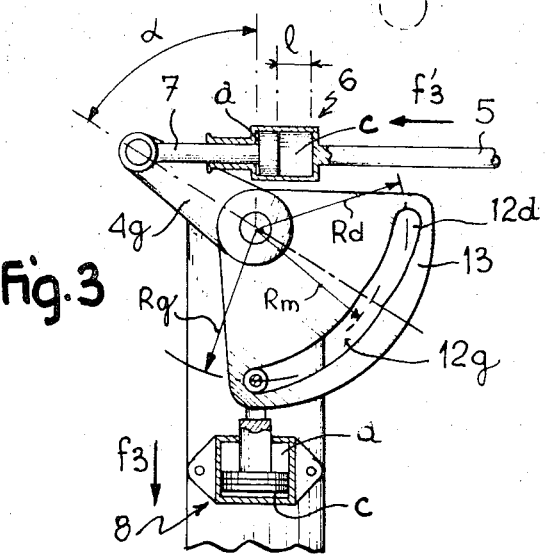
Fig.1
Fig.2
Fig.3

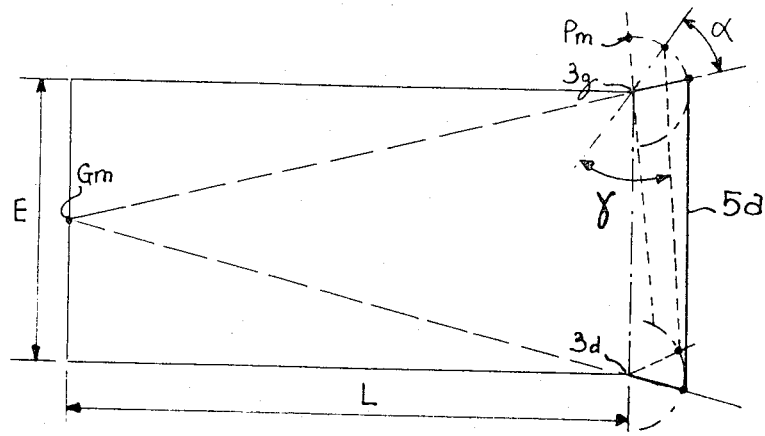
Fig.4
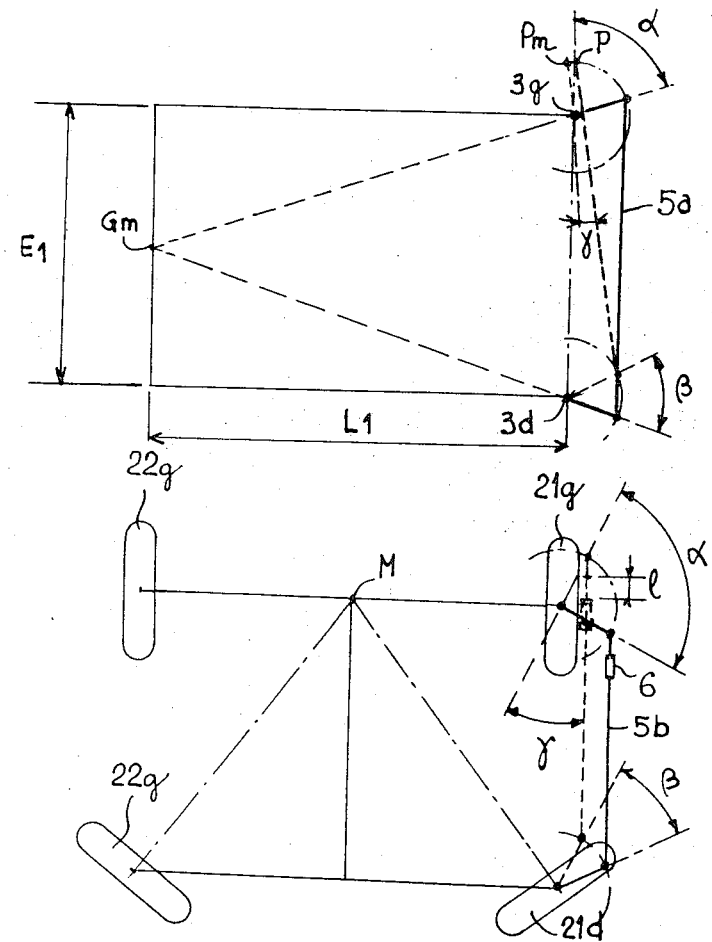
Fig.5
Fig.6

HYDRAULIC JACK ARRANGEMENT FOR THE STEERING MECHANISM OF A VEHICLE

This application is a continuation-in-part application of applicant's application Ser. No. 783,306 filed Dec. 12, 1968 now abandoned, for A HYDRAULIC JACK ARRANGEMENT ALLOWING ADJUSTMENT PARTICULARLY OF A VEHICLE STEERING LINKAGE ELEMENT.

The present invention is directed to an improved steering linkage device for a vehicle having a front set of steering wheels, such device premitting remarkably great turning angles, even when the longitudinal wheelbase of the vehicle is of the order of the width of its tread, as is the case for certain agricultural tractors.

It is known in the art that the steering devices of usual self-propelled four-wheeled vehicles comprise, mainly for the control of the pivoting of their two steering wheels, crank arms whose axes converge practically in the centre of the distance between the rear wheels, when the two steering wheels are arranged parallel to each other and to the rear wheels in order to be driven in a straight line.

However, the above conventional arrangement does not permit relatively small pivotings which are necessary for the work of certain tractors because, for such angles, the position of the crank arm of the wheel situated on the inside of the turn with respect to the conventional coupling bar of the crank arms is too close to the neutral position to guarantee the safe pivoting of the inside wheel.

In addition, these angles formed by the crank arm of the inside steering wheel on a turn and the coupling bar are even smaller since the wheelbase of the longitudinal wheels is itself smaller in comparison with the width of the tread of the vehicle.

Steering links of known tractors have already been equipped with two coupling bars arranged obliquely with respect to the transverse direction of the frame in order to permit pivoting angles which are notably greater than with a single coupling bar. However, the two coupling bars must be associated with each other on a median support, rigid with the frame and generally offset to the front of the latter which creates a bulkiness often unacceptable and of difficult maintenance of this support in the centre of the two wheel pivots if the frame is of adjustable width.

The present invention is intended to overcome these drawbacks.

An object of the present invention is directed to an improved steering linkage device comprising a single bar for coupling two crank arms of the pivots of steering wheels and applicable to the front set of steering wheels of a four-wheeled vehicle.

Another object of the invention is to provide a linkage device of the type described above, permitting relatively large pivoting angles of the wheels of a front steering set, such pivoting angles being able to reach with ease a value of 90°.

A further object of the invention is to put forward a linkage device of the above type, permitting the angles formed by the crank arms of the steering wheel pivots and the bar to be large enough to ensure safe operation of the linkage, even for large pivoting angles.

A still further object of the invention is to provide an improved steering linkage device of the above type, capable of equipping a vehicle having a relatively short and relatively wide frame, to permit relatively large angles of pivoting and safe operation of the linkage.

Another object of the invention is to provide a simple linkage device which is inexpensive, easy to implement and to mount on a vehicle of the type mentioned above.

With the foregoing and other objects in view, the invention will be more fully described hereinafter, and will be more particularly pointed out in the claims appended hereto.

In the drawings, wherein like symbols refer to like or corresponding parts throughout the several views:

FIG. 1 shows diagrammatically in plan view, a four-wheeled vehicle equipped with a steering linkage according to the invention;

FIG. 2 shows in side elevation the linkage device of FIG. 1;

FIG. 3 shows on a larger scale an element of the device of FIGS. 1 and 2;

Figure 7:
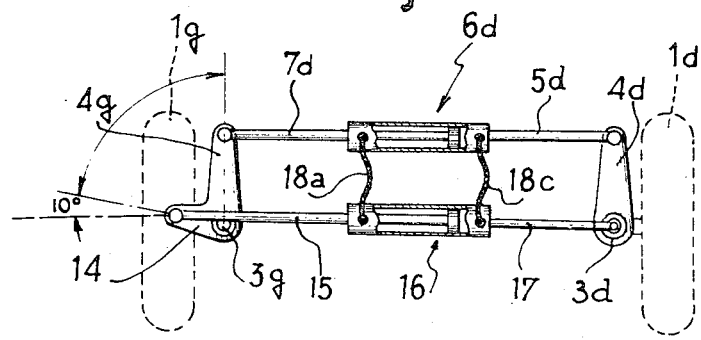
Figure 8A:
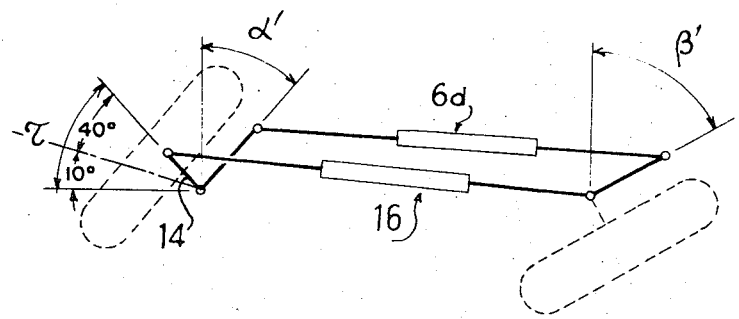
Figure 8B:
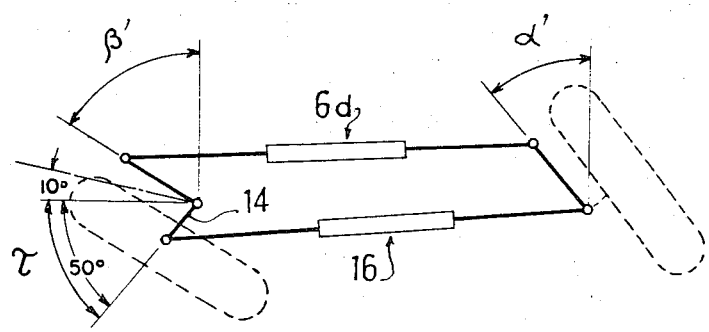

FIGS. 4 to 6 are diagrams permitting of explaining the advantages of the device of FIGS. 1 and 2; and FIGS. 7, 8a and 8b show diagrammatically in plan view, an alternative form of the device of FIGS. 1 and 2.

Shown in FIGS. 1 thru 3 are the outlines of two wheels $1d$, $1g$ arranged in the usual form of a wheel set and in the alignment of two other wheels $2d$, $2g$ which likewise form another wheel set.

These wheels $1d$ to $2g$ are of the type on conventional self-propelled vehicles and these two wheel sets constitute respectively the front and rear wheel sets bearing a frame of a self-propelled vehicle, the frame not being shown for clarity of the FIG. 1.

Each wheel $1d$, $1g$ is mounted in a conventional manner on a spindle (not shown), which spindle is rigid with a pivot $3d$ ($3g$) articulated on the vehicle frame and equipped with a crank arm $4d$ ($4g$) to form a conventional steering linkage element of the vehicle.

A bar 5 is connected in a usual manner by one of its ends to the crank arm $4d$, the other end of bar 5 being rigid with the base of a cylinder $6c$ formed for the sliding of a piston $6p$ and of the ram 7 of the latter, the end of the ram 7 being also articulated to the other crank arm $4g$. The bar 5 and the ram 7 constitute a coupling bar 5–7 for the crank arms $4d$, $4g$, the length of this bar 5–7 being adjustable by a first cylinder $6c$ with piston or ram $6p$ as will be set forth hereinafter. One of the pivots $3d$ or $3g$ is equipped with means for mounting a tie-rod (not shown); this tie-rod being controlled by a usual steering device comprising a column and its steering-wheel (not shown).

A second cylinder and ram unit 8 comprises a cylinder $8c$ and a piston $8p$ rigid with a ram 9. The cylinder $8c$ is fixed radially with respect to the pivot $3g$, on a side-member 10 of the vehicle frame.

In the second cylinder and ram unit 8 the chamber "c" having no ram and having the shape of a cylinder and the chamber "a" including the ram 9 and having an annular form are respectively connected by the hoses $11a$, $11b$ to the companion chambers formed in the first cylinder $6c$ by the piston $6p$.

The free end of the piston ram 9 of the second cylinder 8 is formed in the shape of a clevis having a small roller $9a$ which is engaged in a groove 12 of a plate in the shape of a sector 13, rigid with the crank arm $4g$ and extending perpendicularly to the axis of the corresponding wheel pivot $3g$. The groove 12 has two parts $12d$, $12g$ each formed substantially in the shape of the spiral of an arc substantially centered on the axis of the wheel pivot 3g, the radii Rd, Rg of the end parts of these arcs being larger and respectively equal to each other and the median radius Rm, obviously common to the two arcs, being shorter as best seen in (FIG. 3).

The crank arms 4d, 4g are arranged parallel to each other when wheels 1d, 1g are maintained parallel to each other and to wheels 2d, 2g for movement of the vehicle in a straight line. Under the effect of a stress of changed direction applied to wheels 1d, 1g (for example toward the left, arrows f1, f2) the sector 13 is controlled by its pivot in order to actuate, by means of the cam 12g, the cylinder 8 in the direction of its shortening arrow f3 shown in FIG. 3.

The cylindrical chambers c and the annular chambers a of the second cylinder and ram 8 and of the first cylinder and ram 6 constitute, together with hoses 11a, 11b two closed systems of constant volumes which are associated to each other by the pistons 8p, 6p. This ensures movements in opposite directions of these pistons in their cylinders. In this way, the shortening of the second cylinder and ram 8 causes an elongation ("l" is maximum) of the bar 5–7, the angular course "alpha" of the wheel 1g being thereby greater than the angular course "beta" of the wheel 1d.

The power necessary for the above operation is a very small part of the power applied manually to the steering wheel to ensure movement of the linkage elements because this fraction of power must overcome only the friction of the rams and the pistons in their cylinders and those of the fluids in the chambers a, c and the hoses 11a, 11b of the two closed systems.

It is easy to choose, on the one hand, the arcs 12d, 12g of the cam 12 a profile and, on the other hand, for the cylinders 6c and 8c sections which ensure for each wheel orientation with respect to the direction of rolling along a straight line, a common position G for the turning centers of four wheels, which center is located (for all values that the angles alpha and beta may take) along the line m, n of the points of contact of the rear wheels 2d, 2g on the ground. Finally, it is indicated that in a turn the device permits a vehicle of the usual type to take an orientation alpha of the "inside wheel" which may greatly exceed 60° and, of course, the cam arc (12g in FIG. 1) which corresponds to the "inside angle of rotation" of the wheel pivot equipped with sector 13 presents an angular opening equal to the maximum value of said angle alpha. The other wheel then presents an orientation beta and it will be understood that the other cam arc 12 (12d in FIG. 1) is also equal to the maximum value of beta. In this way, turning to the right will cause utilization of the arc 12d to ensure to the wheel 1g an orientation beta toward the right, an elongation l of the bar 5–7 and an orientation alpha of the wheel 1d to the right.

Moreover, the linkage device described above is advantageously applicable to an agricultural tractor due to the very small turning radii which it forms and to the safety of operation of said linkage, in fact, with a view to clarification, it will be recalled that as shown in (FIG. 4) conventional self-propelled vehicles having a single rigid coupling bar 5a present treads E of their wheel sets 1d–2g, which are of the order of half the length of the wheelbase L of its wheels. For the position for rolling in a straight line on all four wheels, the axes of arm 4d, 4g converge to the middle Gm of the distance between the rear wheels so that such a linkage permits maximum values of the turning angles alpha (inside wheel on the turn) lower than 60°. For such turns, the angle "gamma" formed by arm 4g in this example and by the coupling bar 5a is of the order of 22°, which is just sufficient to ensure good operation of the linkage.

As shown in (FIG. 5), this conventional linkage applied to a tractor having a relatively short frame of which the wheelbase L1 is of the order of the size of its treads E1 does not permit wide turns, for example of 50° or 75°, because the angle gamma mentioned above is then of the order of 20° or 6°30' respectively, and the point of connection P of the bar 5a on the arm 4g is too close to its neutral position Pm.

There is obtained a substantial increase in the maximum turning angle alpha by adopting a parallel disposition of the arms 4d, 4g in accordance with the form of embodiment shown in FIG. 1.

In addition, the coupling of two tractors having two steering wheels 21d, 22d and 21g, 22g arranged in line (FIG. 6) a coupling bar 5b which is shorter than the distance between the wheel pivots 3d, 3g causes a divergent disposition, with respect to the rear wheel set 2d, 2g, of the arms 4d, 4g, which further increases the maximum value of this angle alpha. The angles formed by the arm of the inside wheel on the turn and by the coupling bar are again equal to 30°, which ensures good operation of the linkage.

The application of such an arrangement of arms 4d, 4g to the bar linkage 5–7 of adjustable length described above, permits maximum turning values alpha at least equal to 90° the angles gamma being again 26°30', for pivot 3d as well as for pivot 3g.

A tractor of the type shown in FIG. 6, employing this linkage permits pivoting about the point M situated in the middle of the frame of the elementary tractor arranged on the inside of a turn, which is advantageous because it is possible to reduce the headlands formed by the half turns at the ends of the rows of aligned plantations.

Shown in FIGS. 7 and 8 is an extensible coupling bar similar to bar 5–7 of FIG. 1. This bar is constituted by a ram 5d connected at one end to the crank arm 4d and rigid at its other end with the base of the cylinder of the first cylinder and ram 6d comprising a piston ram 7d, which piston ram 7d is connected to crank arm 4g. The minimum length of said bar is practically equal to the distance between pivots 3d, 3g. The pivot 3g of the steering wheel 1g being rigid with a crank arm 14 of which the pivotal axis forms with the axis of the arm 4g an angle which is slightly smaller than 90° (for example 80°).

The piston ram 15 of the second hydraulic cylinder and ram unit 16 is connected to this arm; the base of the cylinder 16c of said unit being rigid with a ram 17, the free end of which is connected to the wheel pivot 3d.

The cylindrical chambers c and the annular chambers a of these two cylinder and ram units are connected to one another by flexible hoses 18a, 18c in order to form two systems of constant volumes associated by the pistons of cylinder and rams 6d and 16.

Such a system of cylinder and rams 6d, 16 ensures fairly wide pivoting of the wheel on the inside of a turn; the precision of the orientation of wheels 1d, 1g is less efficient than that created by the cam mechanism of FIG. 1, but the latter mechanism is more complicated and bulky than the tie-rod system of FIG. 7.

The securing of the ram 17 on the pivot 3d reduces as much as possible "orientation errors" of wheels 1d, 1g at the start of the turn. The end of ram 17 may be mounted on another element of the vehicle frame.

It is clear that the replacement of units 6, 8 and 6d, 16 by units having pistons with two rams would not modifiy the operational results described above, since these piston rams would form an annular chamber in their respective cylinders.

What I claim is:

1. A steering linkage system for use with a vehicle having a frame and steering ground supporting wheels therefor;
   a pair of pivot means journaled on the frame and each rigid with the axis of rotation of said steering ground supporting wheels;
   a pair of crank arms, one end of each of which is secured to each one of said pivot means;
   bar means having a first hydraulic cylinder pivotally connected to one of its ends to the free end of one of said crank arms;
   a piston within said first cylinder, said piston having a ram pivotally connected to its free end to the free end of the other of said pair of crank arms;
   a second hydraulic cylinder connected by one of its ends to a fixed point of the frame;
   a second piston within said second cylinder, said piston having a ram operatively connected with at least one of the pivot means;
   and fluid means connecting the chamber of the second cylinder with corresponding chambers of said first cylinder to form two systems of constant volume.

2. A steering linkage system as claimed in claim 1 wherein the ram of said second piston is operatively connected with at least one of the pivot means, by a plate rigid with said pivot means and having a groove in which is engaged a roller fixed to the end of the ram of the second piston.

3. A steering linkage system as claimed in claim 1, wherein said second piston is operatively connected with at least one of the pivot means by a crank arm axis angularly spaced to the geometrical axis of said second cylinder.

4. A linkage system for steering the front wheels of a vehicle comprising,
   a pair of pivots journaled on frame elements of the vehicle and each rigid with an axis of rotation of said front wheels,
   a pair of crank arms respectively rigid with said pivots,
   bar means engaged and maintained coaxially in sliding members and respectively articulated by one of their ends to said crank arms,
   a system of two hydraulic cylinders and rams connected to each other by flexible hoses to form two constant and closed volumes, the cylinder and ram of one of said hydraulic cylinders and rams being associated respectively to said sliding members, and
   means for coupling the second hydraulic cylinder and ram to one of said pivots to ensure the operation of said second cylinder and ram under a pivoting action of said pivot.

5. A steering linkage system as claimed in claim 4 wherein the two coaxially arranged bar means form a coupling bar having a minimum length equal to or substantially shorter than the distance between the pivots on the frame elements of the vehicle.

6. A steering linkage as claimed in claim 5 wherein the coupling device of one of said cylinder and rams comprises a plate rigid with one of said pivots and having a groove in which rides a roller rigid with the ram of said second cylinder and ram.

7. A steering linkage as claimed in claim 4 wherein the coupling means of said second cylinder and ram comprises a crank arm rigid with one of the pivots and on which is articulated one of the parts of said second cylinder and ram.

8. A steering linkage as claimed in claim 7, wherein the other part of said second cylinder and ram is attached by means of an articulation to the other pivot.

* * * * *